United States Patent
Lee

(10) Patent No.: US 11,370,698 B2
(45) Date of Patent: Jun. 28, 2022

(54) MASKING AND FIXTURING OF A GLASS-BASED ARTICLE DURING A COATING PROCESS AND ARTICLES PRODUCED THEREBY

(71) Applicant: CORNING INCORPORATED, Corning, NY (US)

(72) Inventor: Jae-chang Lee, Seoul (KR)

(73) Assignee: Corning Incorporated, Corning, NY (US)

( * ) Notice: Subject to any disclaimer, the term of this patent is extended or adjusted under 35 U.S.C. 154(b) by 315 days.

(21) Appl. No.: 16/347,120

(22) PCT Filed: Oct. 31, 2017

(86) PCT No.: PCT/US2017/059261
§ 371 (c)(1),
(2) Date: May 2, 2019

(87) PCT Pub. No.: WO2018/085259
PCT Pub. Date: May 11, 2018

(65) Prior Publication Data
US 2019/0270668 A1    Sep. 5, 2019

(30) Foreign Application Priority Data

Nov. 4, 2016    (KR) .......................... 10-2016-0146586

(51) Int. Cl.
*C03C 17/00* (2006.01)
*B05B 12/20* (2018.01)
(Continued)

(52) U.S. Cl.
CPC ............ *C03C 17/002* (2013.01); *B05B 12/20* (2018.02); *C03C 17/28* (2013.01);
(Continued)

(58) Field of Classification Search
CPC . C03C 17/002; C03C 17/22–23; C03C 17/28; C03C 2218/34; C03C 2218/328;
(Continued)

(56) References Cited

U.S. PATENT DOCUMENTS 6,120,908 A    9/2000  Papanu et al.
9,110,230 B2   8/2015  Koch, III et al.
(Continued)

FOREIGN PATENT DOCUMENTS

CN    101100280 A    1/2008
CN    101855589 A    10/2010
(Continued)

OTHER PUBLICATIONS

International Search Report and Written Opinion of the International Searching Authority; PCT/US2017/059261; dated Mar. 2, 2018; 11 Pages; European Patent Office.
(Continued)

*Primary Examiner* — Elizabeth A Burkhart
(74) *Attorney, Agent, or Firm* — William J. Tucker

(57) ABSTRACT

Methods for coating a glass-based article, for example a cover glass, with a coating layer that is not deposited on the perimeter edge of the glass-based article. The methods may include direct patterning of a sacrificial material over a first region on a top surface the glass-based article but not a second region on the top surface of the glass-based article. The first region includes at least a portion of a perimeter edge of the glass-based article that is to be protected from deposition of the coating layer. After direct patterning of a sacrificial material and deposition of a coating layer, the sacrificial material may be removed such that the coating layer is disposed on the second region on the top surface of
(Continued)

the glass-based article and not the first region. These methods may be used to make a glass-based article with non-edge-to-edge coating layers.

20 Claims, 11 Drawing Sheets

(51) Int. Cl.
C03C 17/36 (2006.01)
C03C 17/28 (2006.01)

(52) U.S. Cl.
CPC ...... C03C 17/3607 (2013.01); *C03C 2218/32* (2013.01); *C03C 2218/328* (2013.01); *C03C 2218/34* (2013.01); *C03C 2218/355* (2013.01)

(58) Field of Classification Search
CPC ... G02B 1/14; B29D 11/00865; C23C 14/042; C23C 14/50; C23C 16/042; B05B 12/20
See application file for complete search history.

(56) References Cited

U.S. PATENT DOCUMENTS

| | | | |
|---|---|---|---|
| 9,272,947 | B2 | 3/2016 | Baca et al. |
| 9,328,016 | B2 | 5/2016 | Paulson |
| 9,335,444 | B2 | 5/2016 | Hart et al. |
| 9,359,261 | B2 | 6/2016 | Bellman et al. |
| 9,957,609 | B2 | 5/2018 | Lee et al. |
| 2003/0205192 | A1 | 11/2003 | Aiba et al. |
| 2009/0304931 | A1* | 12/2009 | Uenosono ............... B05B 12/20 427/282 |
| 2010/0200541 | A1 | 8/2010 | Habassi et al. |
| 2012/0327568 | A1 | 12/2012 | Shedletsky et al. |
| 2013/0005116 | A1* | 1/2013 | Bedell .................. H01L 21/304 438/462 |
| 2013/0017344 | A1* | 1/2013 | Delsol ................... C03C 17/002 427/595 |
| 2013/0129986 | A1* | 5/2013 | Heley ................... G03F 7/2014 428/173 |
| 2013/0183489 | A1 | 7/2013 | Cremer et al. |
| 2014/0363683 | A1* | 12/2014 | Sherwood ................ G02B 1/14 428/429 |
| 2015/0024191 | A1 | 1/2015 | Cremer et al. |
| 2015/0060401 | A1* | 3/2015 | Chang .................... C03C 17/32 216/38 |
| 2015/0198838 | A1 | 7/2015 | Bornstein et al. |
| 2018/0108560 | A1* | 4/2018 | Boughton ......... H01L 21/68735 |

FOREIGN PATENT DOCUMENTS

| | | |
|---|---|---|
| CN | 104898380 A | 9/2015 |
| JP | 2004306217 A | 11/2004 |
| JP | 4207158 B2 | 1/2009 |
| JP | 2009010157 A | 1/2009 |
| JP | 4350992 B2 | 10/2009 |
| KR | 10-0513916 | 9/2005 |
| KR | 20150015956 A | 2/2015 |
| WO | 2013/082477 A2 | 6/2013 |
| WO | 2013/082488 A2 | 6/2013 |
| WO | 2013/106629 A2 | 7/2013 |
| WO | 2013/106638 A1 | 7/2013 |

OTHER PUBLICATIONS

Takacs et al; "UV Baked/Cured Photresist Used as a Sacrificial Layer in MEMS Fabrications"; Army Research Laboratory—MR602 (2005) 14 Pages.

Chinese Patent Application No. 201780082157.5, Office Action dated Jun. 21, 2021, 9 pages (5 pages of English Translation and 4 pages of Original Document), Chinese Patent Office.

* cited by examiner

MASKING AND FIXTURING OF A GLASS-BASED ARTICLE DURING A COATING PROCESS AND ARTICLES PRODUCED THEREBY

BACKGROUND

Cross-Reference To Related Applications

This application claims the benefit of priority under 35 U.S.C. § 371 of International Application No. PCT/US17/59261, filed on Oct. 31, 2017, which claims the benefit of priority to Korean Patent Application No. 10-2016-0146586 filed on Nov. 4, 2016, the contents of both of which are relied upon and incorporated herein by reference in their entirety.

Field

The present disclosure relates to coating of a glass-based article, for example, a cover glass. In particular, the present disclosure relates to protecting edges of a glass-based article from coating during a coating deposition process.

BACKGROUND

Glass-based articles, for example cover glass, for example cover glass for a mobile phone, may be manufactured with one or more surface treatments to enhance its functions and provide a positive experience for an end user. For example, cover glass may be coated with one or more coating layers to provide desired characteristics. Such coating layers include anti-reflection coating layers, easy-to-clean coating layers, and scratch resistant coating layers. These coating layers can be applied on a surface of the cover glass using various vacuum deposition methods for example sputtering, physical vapor deposition (PVD), and chemical vapor deposition (CVD). These coating layers may be applied to an entire surface of the cover glass, i.e., an edge-to-edge coating of a cover glass surface. In some cases, a pressure sensitive adhesive (e.g., double-sided Kapton tape) may be used to hold cover glass on a support plate during an edge-to-edge coating process.

A scratch resistant coating layer can provide a glass surface (e.g., a cover glass' surface) with the characteristic of very high hardness, which may prevent formation of scratches on the glass surface and minimize the possibility of glass failure (e.g., fracture) during use. Such a coating layer should provide a high degree of hardness without adversely affecting other properties of the cover glass (e.g., other mechanical properties). Therefore, a continuing need exists for innovations in coating layers for glass-based articles and methods of depositing these coating layers on a surface of the glass-based articles.

BRIEF SUMMARY

The present disclosure is directed to glass-based articles, for example a cover glasses, and methods for coating certain regions on a surface of a glass-based article with a coating layer.

Some embodiments are directed towards a method of coating a glass-based article, the method including direct patterning a sacrificial material over a first region on a top surface of the glass-based article but not a second region on the top surface of the glass-based article, the first region including at least a portion of a perimeter edge of the glass-based article; depositing a coating layer over the glass-based article; and removing the sacrificial material such that the coating layer is disposed on the second region on the top surface of the glass-based article and not the first region.

In some embodiments, the method according to the embodiments of the preceding paragraph may include curing the sacrificial material after direct patterning of the sacrificial material and before depositing a coating layer.

In some embodiments, the embodiments of any of the preceding paragraphs may further include a first region that: extends around the entire perimeter edge of the glass-based article and/or that extends from the perimeter edge of the glass-based article to a distance in the range of 0.1 mm to 1.0 mm from the perimeter edge.

In some embodiments, the embodiments of any of the preceding paragraphs may include direct patterning of the sacrificial material that includes a process selected from the group including screen printing, inkjet printing, and dispensing.

In some embodiments, the embodiments of any of the preceding paragraphs may further include disposing the glass-based article on a base plate having a cavity: configured to hold the glass-based article before direct patterning of the sacrificial material and/or including a perimeter wall with a shape that corresponds to the shape of the perimeter edge of the glass-based article.

In some embodiments, the embodiments of any of the preceding paragraphs may include directly pattering the sacrificial material on the first region of the glass-based article and a portion of the base plate around the perimeter edge of the glass-based article while the glass-based article is disposed on the base plate and/or may include curing the sacrificial material after directing patterning of the sacrificial material, such that the sacrificial material releasably fixes the glass-based article to the base plate when the sacrificial material is cured.

In some embodiments, the embodiments of any of the preceding paragraphs may further include removing the glass-based article from the base plate after the coating layer is deposited over the glass-based article. In some embodiments, the sacrificial material may be removed after the glass-based article is removed from the base plate.

In some embodiments, the embodiments of any of the preceding paragraphs may include a coating layer including a scratch resistant coating layer.

In some embodiments, the embodiments of any of the preceding paragraphs may include directly patterning the sacrificial material as a liquid having a viscosity of greater than or equal to 200 centipoise (cps).

In some embodiments, the embodiments of any of the preceding paragraphs may include a sacrificial material selected from the group including a photoresist and a polyamide.

In some embodiments, the embodiments of any of the preceding paragraphs may include sacrificial material having a thickness of greater than or equal to 10 microns after curing.

In some embodiments, the embodiments of any of the preceding paragraphs may include a glass-based article including an aperture defining an opening through the glass-based article and the direct patterning of the sacrificial material may include direct patterning sacrificial material in a third region on the top surface of the glass-based article around a perimeter edge of the aperture.

In some embodiments, the embodiments of any of the preceding paragraphs may further include disposing the glass-based article on a base plate having a cavity configured to hold the glass-based article before direct patterning of the sacrificial material, where the base plate includes a protrusion extending into the cavity with an exterior shape corresponding to the shape of the aperture on the glass-based article, and where the sacrificial material is directly patterned on the third region of the glass-based article and at least a portion of the protrusion while the glass-based article is disposed on the base plate.

Some embodiments are directed towards an article including a cover glass having a top surface, the top surface having a first region and a second region, and the first region including at least a portion of a perimeter edge of the top surface; and a scratch resistant coating disposed on the second region but not the first region, where the first region includes the entire perimeter edge of the cover glass and the first region extends from the perimeter edge of the cover glass to a distance in the range of 0.1 mm to 1.0 mm from the perimeter edge.

In some embodiments, the article according to embodiments of the preceding paragraph may include a cover glass including an aperture defining an opening through the cover glass and a third region including a perimeter edge of the aperture, where the scratch resistant coating is not disposed on the third region.

In some embodiments, the article according to embodiments of any of the preceding paragraphs may be a consumer electronic product, the consumer electronic product including a housing having a front surface, a back surface and side surfaces; electrical components provided at least partially within the housing, the electrical components including at least a controller, a memory, and a display, the display being provided at or adjacent the front surface of the housing; and the cover glass, wherein the cover glass is disposed over the display.

Some embodiments are directed towards a coated cover glass made by the method including direct patterning a sacrificial material over a first region on a top surface the cover glass but not a second region on the top surface of cover glass, the first region including at least a portion of a perimeter edge of the cover glass; depositing a coating layer over the cover glass; and removing the sacrificial material such that the coating layer is disposed on the second region on the top surface of the cover glass and not the first region.

BRIEF DESCRIPTION OF THE DRAWINGS

The accompanying figures, which are incorporated herein, form part of the specification and illustrate embodiments of the present disclosure. Together with the description, the figures further serve to explain the principles of and to enable a person skilled in the relevant art(s) to make and use the disclosed embodiments. These figures are intended to be illustrative, not limiting. Although the disclosure is generally described in the context of these embodiments, it should be understood that it is not intended to limit the scope of the disclosure to these particular embodiments. In the drawings, like reference numbers indicate identical or functionally similar elements.

DETAILED DESCRIPTION

Figure 1:
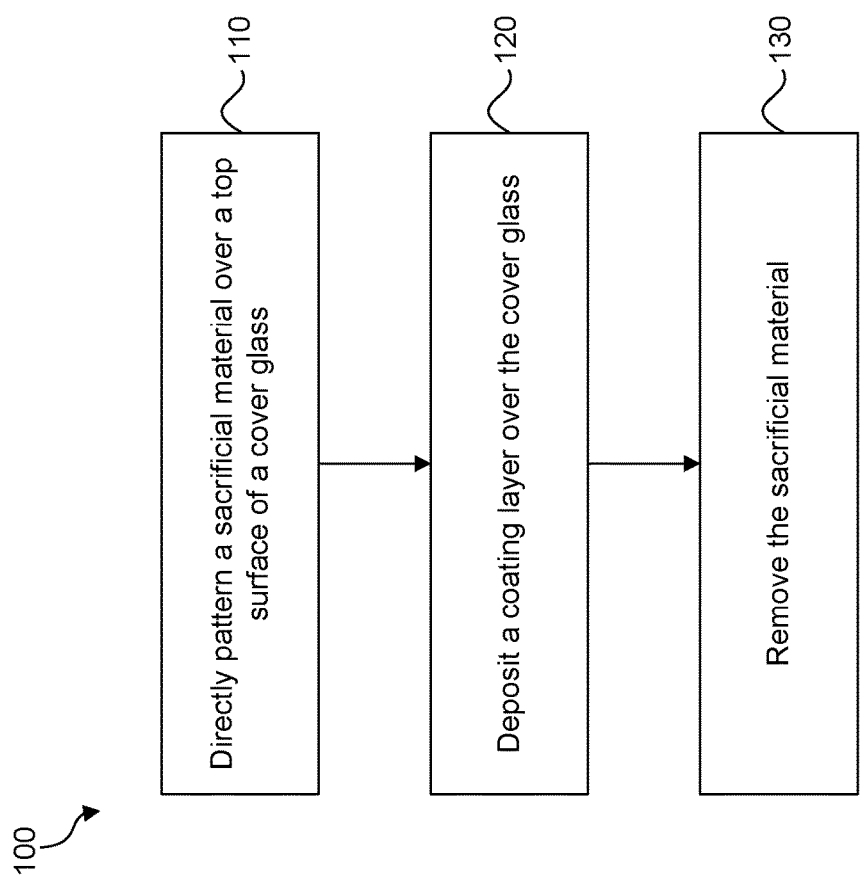
FIG. 1 illustrates an exemplary method of coating cover glass according to some embodiments.

The following examples are illustrative, but not limiting, of the present disclosure. Other suitable modifications and adaptations of the variety of conditions and parameters normally encountered in the field, and which would be apparent to those skilled in the art, are within the spirit and scope of the disclosure.

Coating layers for a glass-based article, for example a cover glass, may serve to, among other things, reduce undesired reflections, prevent formation of mechanical defects in the glass (e.g., scratches or cracks), and/or provide an easy to clean transparent surface. The glass-based articles disclosed herein may be incorporated into another article such as an article with a display (or display articles) (e.g., consumer electronic products, including mobile phones, tablets, computers, navigation systems, wearable devices (e.g., watches) and the like), architectural articles, transportation articles (e.g., automotive, trains, aircraft, sea craft, etc.), appliance articles, or any article that requires some transparency, scratch-resistance, abrasion resistance or a combination thereof. An exemplary article incorporating any of the glass-based articles disclosed herein is consumer electronic device including a housing having front, back, and side surfaces; electrical components that are at least partially inside or entirely within the housing and including at least a controller, a memory, and a display at or adjacent to the front surface of the housing; and a cover substrate at or over the front surface of the housing such that it is over the display. In some embodiments, the cover substrate may include any of the glass-based articles disclosed herein. In some embodiments, at least one of a portion of the housing or the cover glass comprises the glass-based articles disclosed herein.

Coating layers for glass-based articles should provide one or more desirable characteristics without detrimentally affecting other characteristics of the glass-based article. For example, it has been observed that edge-to-edge coating of a scratch resistant coating layer may negatively affect the edge strength of cover glass and may decrease the 4-point bending strength and impact strength of the cover glass. These negative effects are attributed to the high stiffness and hardness of a scratch resistant coating layer located on the edges of the cover glass (e.g., perimeter edges). Since impact strength is directly related to the drop performance, inclusion of a scratch resistant coating may weaken the structural integrity of a cover glass installed on an electronic device. This is undesirable because the formation of cracks or the complete fracture of the cover glass may make use of an electronic device difficult for a user and may expose portions of the electronic device (e.g., display components) to environmental elements that may be harmful to those components.

The coating process used to deposit coating layers, for example scratch resistant coating layers, may be tailored to provide desired characteristics without detrimentally affecting other characteristics of a glass-based article. For example, a coating process that prevents the formation of a coating layer at and around the perimeter edges of a glass-based article (e.g., a cover glass) may minimize detrimental effects resulting from edge-to-edge coating of such a coating layer. Further, a coating process that prevents formation of a coating layer at and around interior edges of a cover glass (e.g., the edges of opening(s) in the cover glass) may minimize detrimental effects resulting from edge-to-edge coating of such a coating layer.

While preventing edge-to-edge coating may be beneficial for the structural integrity of a glass-based article, a process for preventing such edge-to-edge coatings that is cost effective may also be beneficial in some instances. For example, a process that requires minimal manufacturing steps and/or reduces the amount of materials consumed may be beneficial in some instances. Further, a process that can be easily adapted to different sizes and shapes of glass-based articles (e.g., different sizes and shapes of cover glass) may be desirable in some instances. A process that may be used to coat all types of cover glasses (e.g., 2D, 2.5D and 3D cover glasses as described in reference to FIGS. 8A-8C), regardless of their dimensions, may reduce manufacturing costs by reducing the number of parts and/or steps needed to manufacture different cover glasses for different devices. The processes discussed herein provide for a cost effective and adaptable method for preventing edge-to-edge coating of one or more coating layers on a glass-based article.

The processes discussed herein may be employed to mask a glass-based article to protect one or more regions on its front (user-facing) surface and edges from coating during a coating process (e.g., during a vacuum deposition process). In some embodiments, one or more sacrificial material patterns may be disposed on a glass-based article to protect one or more regions of the glass-based article from coating during a coating process. In some embodiments, the sacrificial material may be directly patterned on the region(s) to protect those regions. A patterned sacrificial material may be referred to as a sacrificial layer.

As used herein, the terms "directly patterned" or "direct patterning" mean a process where a sacrificial material is patterned over specific regions of a surface, but not the entire surface, when the sacrificial material is deposited. In other words, the sacrificial material is deposited in a pattern (e.g., in one or more shapes, or having regular or irregular form, or including one or more design elements that may or may not be repeated) on specific regions of a surface (e.g., a cover glass surface). When a sacrificial material is directly patterned, the specific region(s) on a surface that one desires to protect from coating are covered with the sacrificial material.

Direct patterning of a sacrificial material is different from a photolithography method. In many cases, direct patterning may use less sacrificial material for a given size and shape of glass-based article (e.g., cover glass) because the entire surface of the glass-based article is not covered during direct patterning. Direct patterning also utilizes fewer steps than a photolithographic technique because it does not require exposure and development steps to form a pattern. In some cases, for example in a direct patterning process including inkjet printing, 3-D printing, or nozzle/pipet dispensing, the direct patterning process may be easily adaptable to all shapes and sizes of glass-based article because the pattern deposited can be easily controlled in all three principle directions (X, Y, Z) by controlling the device used to directly pattern a sacrificial material. This may be particularly beneficial for 3D cover glasses. In some embodiments, for example in a direct patterning process including inkjet printing, 3-D printing, or nozzle/pipet dispensing, the direct patterning process may utilize all the material dispensed during patterning. In other words, the direct patterning process may be accomplished without discarding sacrificial material when forming a pattern.

In some embodiments, a glass-based article may be releasably fixed to a base plate during a coating process. In some embodiments, a sacrificial material may releasably fix the glass-based article to the base plate. In such embodiments, the sacrificial material may function to simultaneously mask and fix a glass-based article during a coating process. In some embodiments, the sacrificial material may be directly patterned on specified regions of a glass-based article surface and specified regions on a base plate adjacent to the edges (perimeter or interior) of the glass-based article.

In some embodiments, the sacrificial material may be cured after it is directly patterned and before deposition of a coating layer. The sacrificial material may be cured by, for example, ultra-violet (UV) light, microwave energy, infrared (IR) light, thermal heating, or a combination thereof. In such embodiments, the curing may cause the sacrificial material to set into a hardened form that releasably adheres the glass-based article to a base plate.

After coating of a coating layer on a glass-based article, the sacrificial material on the glass-based article may be removed by an etching process. During the etching process, any part of coating layer deposited on the sacrificial material is also removed via removal of the sacrificial material. The etching process may include, for example but not limited to, a wet etching process. For example, in some embodiments, the etching process may include dipping the glass-based article into a solution that dissolves or otherwise breaks down the sacrificial material. Once the sacrificial material is removed, a coating layer is present on surface regions where the sacrificial material was not patterned (e.g., on all regions of a glass-based article surface except those at and around edges of the glass-based article where the sacrificial material was deposited and formed a mask).

FIG. 1 shows an exemplary method 100 for coating a cover glass according to some embodiments. In step 110, a sacrificial material is directly patterned over a first region on a top (user-facing) surface the cover glass (e.g., first region 318 on top surface 312 in FIG. 3) but not a second region on the top surface of cover glass (e.g., second region 322 on top surface 312 in FIG. 3). The first region includes at least a portion of a perimeter edge of the cover glass (e.g., perimeter edge 316 in FIG. 3). In some embodiments, the first region may include the entire perimeter edge of the cover glass. In some embodiments, method 100 may include direct patterning of sacrificial material over multiple distinct regions on and around different edges (perimeter and interior) on the top surface of the cover glass. For example, the first region may include the entire perimeter edge of the cover glass and other patterned regions may include all the interior edges defined by openings in the cover glass.

The direct patterning of the sacrificial material on the first region protects the first region from coating of a coating layer deposited during a coating process. In other words, the sacrificial material prevents deposition of the coating layer on the first region of the cover glass' top surface. In some embodiments, the direct patterning of the sacrificial material may include screen printing, inkjet printing, dispensing onto the first region through a nozzle or pipette, or a combination thereof. The sacrificial material patterned in step 110 may be the same as or similar to sacrificial material 222 discussed below.

After direct patterning a sacrificial material in step 110, a coating layer is deposited over the cover glass in step 120. The coating layer may be deposited over both the cover glass and the sacrificial material. But, due to the presence of the sacrificial material on the first region of the cover glass, the coating layer is deposited over the second region on the top surface of the cover glass and is not deposited over the first region on the top surface of the cover glass.

After depositing a coating layer, the sacrificial material is removed in step 130 so that the coating layer is disposed on the second region on the top surface of the cover glass and not the first region. In other words, a cover glass having a non-edge-to-edge coating layer deposited on the second region on the top surface of the cover glass is produced (see e.g., cover glass 700 in FIG. 7).

Figure 2:
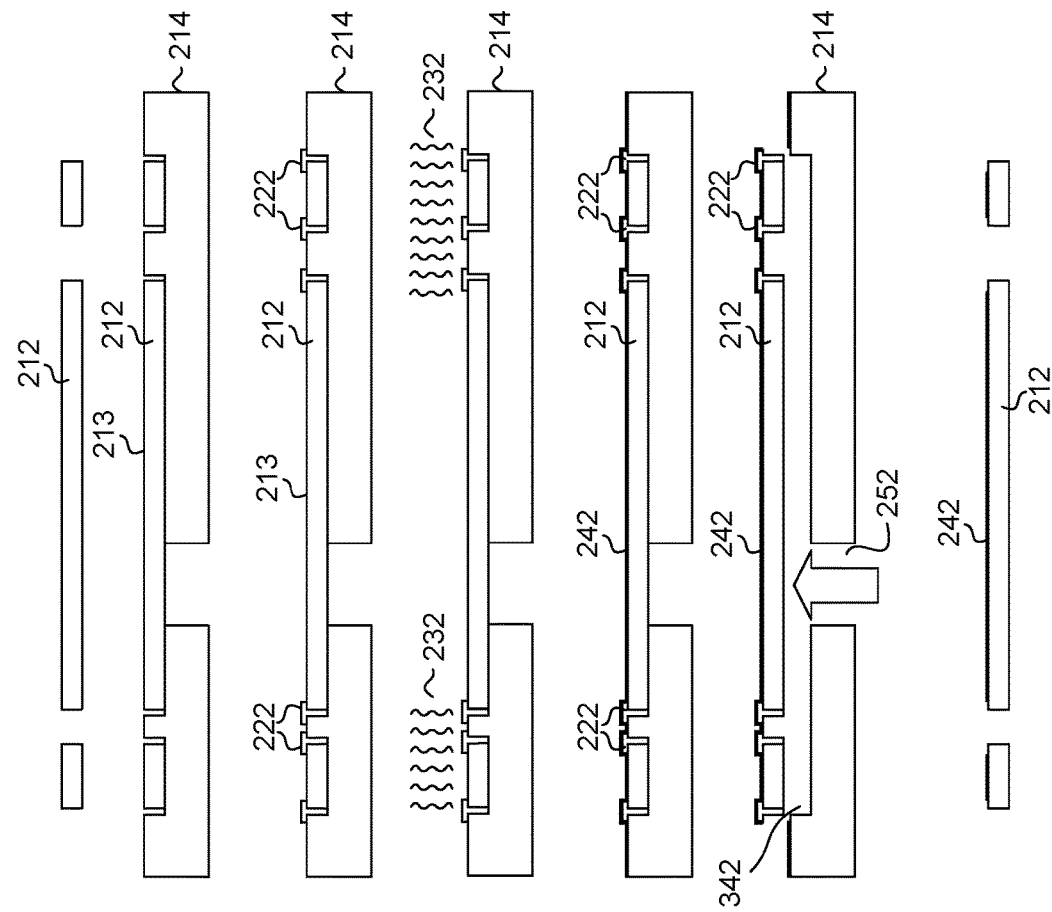
FIG. 2 illustrates an exemplary method of coating cover glass according to some embodiments.
Figure 2:
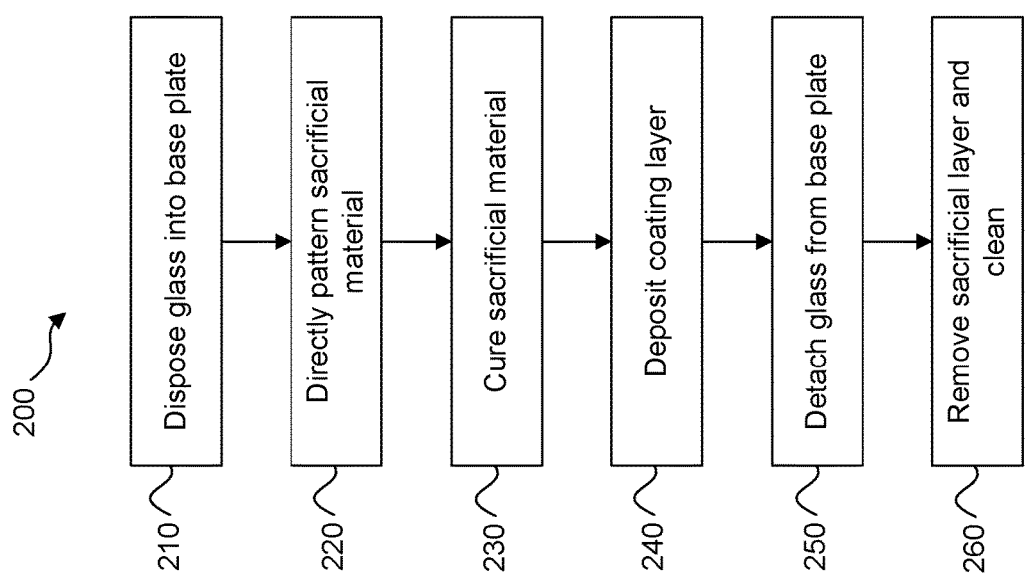

FIG. 2 shows an exemplary method 200 for coating a cover glass according to some embodiments. In step 210, cover glass 212 may be disposed on a base plate 214. Base plate 214 may be configured to hold cover glass 212 in a desired position during direct patterning of a sacrificial material and/or deposition of a coating layer on cover glass 212. In some embodiments, base plate 214 may include a cavity (e.g., cavity 342 in FIGS. 3-4) configured (sized and shaped) to hold cover glass 212 in a desired position. In such embodiments, the cavity may be formed such that all or a portion of cover glass 212 fits into the cavity.

In step 220, a sacrificial material 222 may be directly patterned over an exposed surface 213 (e.g., top surface) of cover glass 212 disposed on base plate 214. Sacrificial material 222 may be patterned over a first region on exposed surface 213 of cover glass 212 (e.g., first region 318 on top surface 312 in FIG. 3) but not a second region on exposed surface 213 of cover glass 212 (e.g., second region 322 on top surface 312 in FIG. 3).

In some embodiments, the patterned sacrificial material 222 may fill spaces between cover glass 212 and base plate 214. In some embodiments, sacrificial material 222 may be patterned in a liquid state on exposed surface 213 of cover glass 212. Patterning with a liquid material may help to ensure that there are little to no gaps between sacrificial material 222 and exposed surface 213 of cover glass 212. The elimination of gaps between sacrificial material 222 and exposed surface 213 helps prevent a coating layer from leaking between sacrificial material 222 and exposed surface 213. Such leakage can result in abnormal deposition of a coating layer adjacent to sacrificial material 222 (see FIG. 10). In some embodiments, sacrificial material 222 may be patterned in a semi-solid state (e.g., as a paste).

In some embodiments, the viscosity and amount of sacrificial material 222 may be tailored to provide the desired dimensions for a first region on cover glass 212 (e.g., first region 318 in FIG. 3), and other protected regions on cover glass 212. In some embodiments, sacrificial material 222 may be directly patterned as a liquid having a viscosity of greater than or equal to 200 centipoise (cps).

A liquid having a viscosity of greater than or equal to 200 cps may facilitate formation of a defect-free pattern of sacrificial material during direct patterning. For example, such a viscosity may facilitate the formation of sacrificial material edges that are consistent with a desired pattern (e.g., edges free of indentations or protrusions). A defect-free pattern of sacrificial material may in turn facilitate the formation of coating layer edges having the desired shape and profile.

Figure 9:
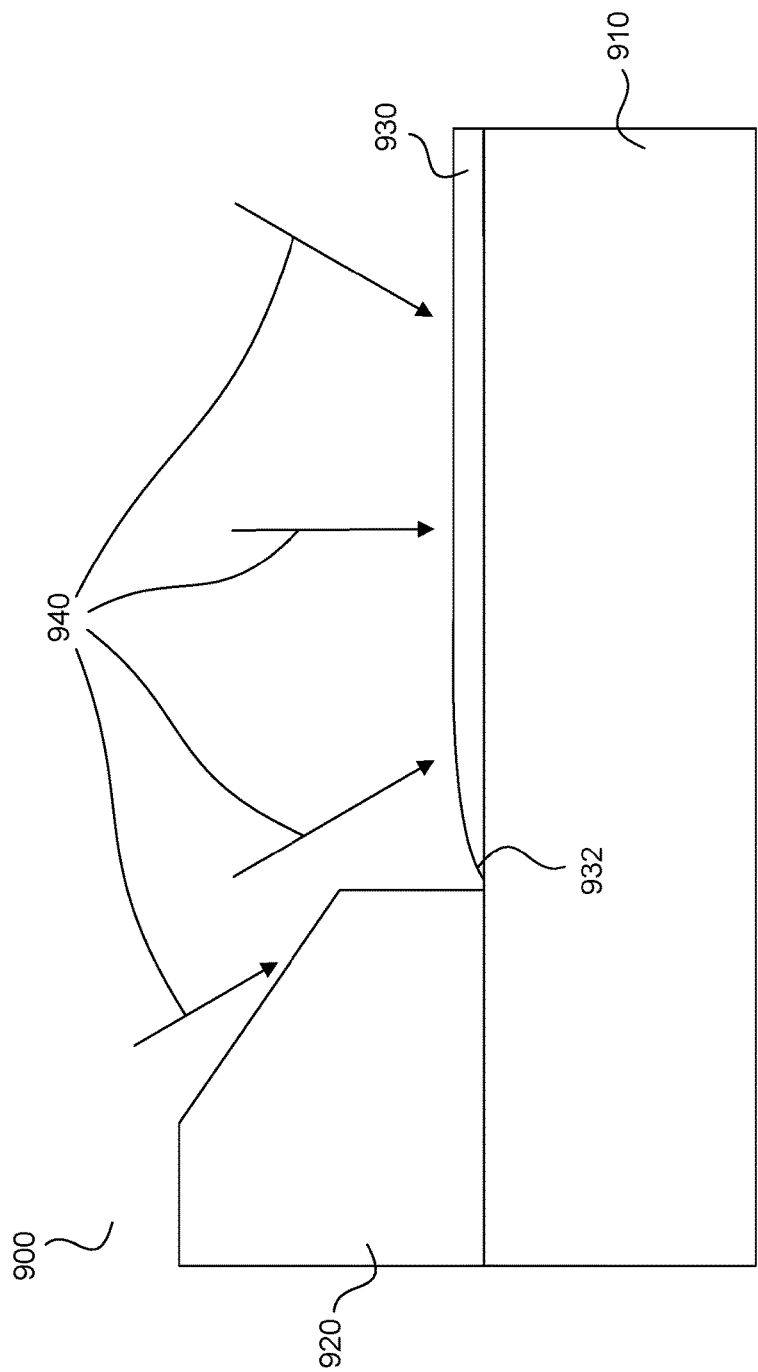
FIG. 9 illustrates a mechanical assembly for masking and fixing cover glass during a coating deposition process.

The formation of a moire pattern (also called a moire fringe) may result from the shadow effect created by an object located at or around the perimeter edge of a cover glass during a coating deposition process (see e.g., mechanical mask 920 shown in FIG. 9). The formation of a moire pattern near and/or at the edges of a coating layer may result in visual defects in the coating layer. In some embodiments, a minimal thickness of a printed sacrificial layer may help reduce the formation of a moire pattern by reducing the effect that a sacrificial layer has on the particle path of coating particles being deposited during a vacuum deposition process, which may affect the coating profile at the edges of a coating layer. In some embodiments, a minimal thickness of printed sacrificial material reduce etching time, efficiency, and amount of etchant needed to remove the printed sacrificial material. In some embodiments, the thickness of sacrificial material 222 may be less than or equal to 100 microns. In some embodiments, a greater thickness of sacrificial material may be used.

In some embodiments, after patterning sacrificial material 222, sacrificial material 222 may be cured by applying energy 232 in step 230. Energy 232 may include, but is not limited to, ultra-violet (UV) light, thermal heat, microwave energy, infrared (IR) light, and a combination thereof. In some embodiments, sacrificial material 222 may cure without the application of external energy (e.g., sacrificial material may cure by exposure to oxygen or ambient temperature). In some embodiments, the curing of sacrificial material 222 may releasably adhere cover glass 212 to base plate 214.

The curing of sacrificial material 222 may harden sacrificial material 222 such that it has enough adhesion strength to hold cover glass 212 on base plate 214 during a vacuum deposition process. In such embodiments, sacrificial material 222 may serve to simultaneously mask regions on exposed surface 213 of cover glass 212 and fix cover glass 212 to base plate 214. In some embodiments, a surface condition of base plate 214 may be modified to provide adequate adhesion with cured sacrificial material 222. In some embodiments, the curing of sacrificial material 222 may chemically and/or physically stabilize sacrificial material 222 such that it can withstand degradation during a vacuum deposition process.

In some embodiments, the thickness of sacrificial material 222 after curing may be greater than or equal to 10 microns. A thickness of greater than or equal to 10 microns may help facilitate formation of a defect-free pattern during direct patterning. For example, such a thickness may facilitate the formation of sacrificial material edges that are consistent with a desired pattern (e.g., edges free of indentations or protrusions). A defect-free pattern of sacrificial material may in turn facilitate the formation of coating layer edges having the desired shape and profile.

In some embodiments, sacrificial material 222 may not be a curable material or may not be cured before deposition of a coating layer in step 240. In such embodiments, the thickness of the non-cured sacrificial material 222 may be greater than or equal to 10 microns.

In some embodiments, sacrificial material 222 may be a photoresist material or a polyamide. In some embodiments, sacrificial material 222 may be a Lift-Of-Resist (LOR) material based on polydimethylglutarimide (available from Microchem Corp., Westborough, Mass.). Sacrificial material 222 should be capable of surviving the conditions (e.g., temperature and pressure) of a vacuum deposition process (e.g., CVD, PVD, or sputtering process). Also, sacrificial material 222 should be a material that is easily removed during a removal (e.g., etching) process so that no sacrificial material residue remains on cover glass 212 after removal of the sacrificial material.

In step 240, a coating layer 242 may be deposited over cover glass 212. Coating layer 242 may coat the regions on exposed surface 213 of cover glass 212 where sacrificial material 222 is not present. In some embodiments, coating layer 242 may have thickness in the range of 1.0 micron to 3.0 microns. In some embodiments, coating layer 242 may have a thickness of about 2.0 microns (e.g., 1.5 microns to 2.5 microns). Exemplary materials used in the scratch resistant coating layer may include an inorganic carbide, nitride, oxide, diamond-like material, or a combination thereof.

In some embodiments, the scratch resistant coating layer may include a multilayer structure of Aluminum Oxynitride (AlON) and Silicon dioxide ($SiO_2$). In some embodiments, the scratch resistant coating layer may include a metal oxide layer, a metal nitride layer, a metal carbide layer, a metal boride layer or a diamond-like carbon layer. Example metals for such an oxide, nitride, carbide or boride layer include boron, aluminum, silicon, titanium, vanadium, chromium, yttrium, zirconium, niobium, molybdenum, tin, hafnium, tantalum, and tungsten. In some embodiments, the coating layer may include an inorganic material. Non-limiting example inorganic layers include aluminum oxide and zirconium oxide layers.

In some embodiments, the scratch resistant coating layer may include a scratch resistant coating layer as described in U.S. Pat. No. 9,328,016, issued on May 3, 2016, which is hereby incorporated by reference in its entirety by reference thereto. In some embodiments, the scratch resistant coating layer may include a silicon-containing oxide, a silicon-containing nitride, an aluminum-containing nitride (e.g., MN and $Al_xSi_yN$), an aluminum-containing oxy-nitride (e.g., $AlO_xN_y$ and $Si_uAl_vO_xN_y$), an aluminum-containing oxide or combinations thereof. In some embodiments, the scratch resistant coating layer may include transparent dielectric materials such as $SiO_2$, $GeO_2$, $Al_2O_3$, $Nb_2O_5$, $TiO_2$, $Y_2O_3$ and other similar materials and combinations thereof. In some embodiments, the scratch resistant coating layer may include a scratch resistant coating layer as described in U.S. Pat. No. 9,110,230, issued on Aug. 18, 2015, which is hereby incorporated by reference in its entirety by reference thereto. In some embodiments, the scratch resistant coating layer may include one or more of AlN, $Si_3N_4$, $AlO_xN_y$, $SiO_xN_y$, $Al_2O_3$, $Si_xC_y$, $Si_xO_yC_z$, $ZrO_2$, $TiO_xN_y$, diamond, diamond-like carbon, and $Si_uAl_vO_xN_y$. In some embodiments, the scratch resistant coating layer may include a scratch resistant coating layer as described in U.S. Pat. No. 9,359,261, issued on Jun. 7, 2016, or U.S. Pat. No. 9,335,444, issued on May 10, 2016, both of which are hereby incorporated by reference in their entirety by reference thereto.

In some embodiments, coating layer 242 may be an anti-reflection coating layer. Exemplary materials suitable for use in the anti-reflective coating layer include: SiO2, Al2O3, GeO2, SiO, $AlO_xN_y$, AlN, $SiN_x$, $SiO_xN_y$, $Si_uAl_v$ $O_xN_y$, $Ta_2O_5$, $Nb_2O_5$, $TiO_2$, $ZrO_2$, TiN, MgO, $MgF_2$, $BaF_2$, $CaF_2$, $SnO_2$, $HfO_2$, $Y_2O_3$, $MoO_3$, $D_yF_3$, $YbF_3$, $YF_3$, $CeF_3$, polymers, fluoropolymers, plasma-polymerized polymers, siloxane polymers, silsesquioxanes, polyimides, fluorinated polyimides, polyetherimide, polyethersulfone, polyphenylsulfone, polycarbonate, polyethylene terephthalate, polyethylene naphthalate, acrylic polymers, urethane polymers, polymethylmethacrylate, and other materials cited above as suitable for use in a scratch resistant layer. An anti-reflection coating layer may include sub-layers of different materials.

In some embodiments, the anti-reflection coating layer may include a hexagonally packed nanoparticle layer, for example but not limited to, the hexagonally packed nanoparticle layers described in U.S. Pat. No. 9,272,947, issued Mar. 1, 2016, which is hereby incorporated by reference in its entirety by reference thereto In some embodiments, the anti-reflection coating layer may include a nanoporous Si— containing coating layer, for example but not limited to the nanoporous Si— containing coating layers described in WO2013/106629, published on Jul. 18, 2013, which is hereby incorporated by reference in its entirety by reference thereto. In some embodiments, the anti-reflection coating may include a multilayer coating, for example, but not limited to the multilayer coatings described in WO2013/106638, published on Jul. 18, 2013; WO2013/082488, published on Jun. 6, 2013; and U.S. Pat. No. 9,335,444, issued on May 10, 2016, all of which are hereby incorporated by reference in their entirety by reference thereto.

In some embodiments, coating layer 242 may be an easy-to-clean coating layer. In some embodiments, the easy-to-clean coating layer may include a material selected from the group consisting of fluoroalkylsilanes, perfluoropolyether alkoxy silanes, perfluoroalkyl alkoxy silanes, fluoroalkylsilane-(non-fluoroalkylsilane) copolymers, and mixtures of fluoroalkylsilanes. In some embodiments, the easy-to-clean coating layer may include one or more materials that are silanes of selected types containing perfluorinated groups, for example, perfluoroalkyl silanes of formula $(R_F)_y$ $Si_{X4-y}$, where RF is a linear C6-$C_{30}$ perfluoroalkyl group, X=Cl, acetoxy, —$OCH_3$, and —$OCH_2CH_3$, and y=2 or 3. The perfluoroalkyl silanes can be obtained commercially from many vendors including Dow-Corning (for example fluorocarbons 2604 and 2634), 3MCompany (for example ECC-1000 and ECC-4000), and other fluorocarbon suppliers such as Daikin Corporation, Ceko (South Korea), Cotec-GmbH (DURALON UltraTec materials) and Evonik. In some embodiments, the easy-to-clean coating layer may include an easy-to-clean coating layer as described in WO2013/082477, published on Jun. 6, 2013, which is hereby incorporated by reference in its entirety by reference thereto. In some embodiments, multiple coating layers 242 may be deposited in step 240.

After coating layer 242 is deposited in step 240, cover glass 212 may be removed (e.g., detached) from base plate 214 in step 250. In some embodiments, cover glass 212 may be detached from base plate 214 by pushing cover glass 212 upward via an opening 252 in base plate 214. The detachment in step 250 may facilitate removal of sacrificial material 222 in step 260 by exposing a larger surface area of sacrificial material 222 to a removal agent (e.g., an etching solution). This may reduce the time needed to remove sacrificial material 222.

Sacrificial material 222 on cover glass 212 is removed in step 260, while coating layer 242 remains. In some embodiments, sacrificial material 222 may be removed by dipping cover glass 212 into a solution in which sacrificial material 222 is solvent, but in which coating layer 242 is not solvent. After removing the sacrificial material 222, cover glass 212 includes coating layer 242 located on exposed surface 213 where sacrificial material 222 was not patterned.

Figure 3:
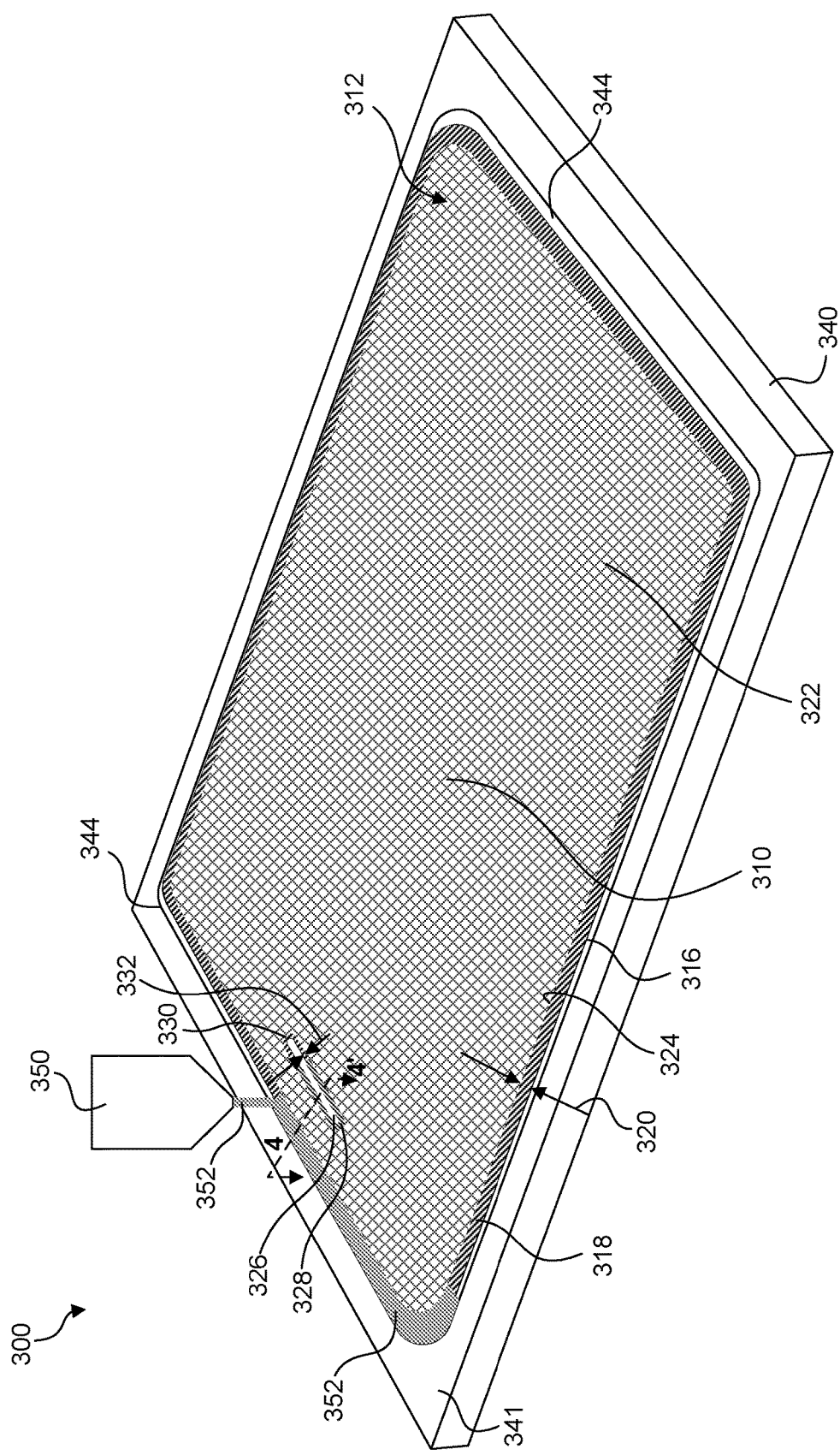
FIG. 3 illustrates a system for coating cover glass according to some embodiments.

FIG. 3 shows a system 300 for direct patterning of a sacrificial material 352 on a cover glass 310 according to some embodiments. System 300 may include a base plate 340 for holding cover glass 310 and a patterning device 350 for direct patterning of sacrificial material 352. In some embodiments, base plate 340 may include a cavity 342 for receiving all or a portion of cover glass 310. Cavity 342 may include a perimeter wall 344 having a shape and size corresponding to the size and shape of a perimeter edge 316 of cover glass 310. In some embodiments, a bottom surface 314 of cover glass 310 may be disposed on a bottom wall 343 of cavity 342 when cover glass 310 is disposed on base plate 340 (see e.g., FIG. 4). Patterning device 350 may be, but is not limited to, an inkjet printer, a screen printer, a 3-D printer, or a dispensing nozzle (e.g., a pipet). Sacrificial material 352 may be the same as or similar to sacrificial material 222 discussed herein.

As shown in FIG. 3, sacrificial material 352 may be directly patterned over a first region 318 on a top surface 312 of cover glass 310. First region 318 on cover glass 310 includes a least a portion of perimeter edge 316 of cover glass 310. In some embodiments, first region 318 may include the entire perimeter edge 316 of cover glass 310. First region 318 may extend from perimeter edge 316 of cover glass 310 to a distance 320 from perimeter edge 316. In other words, distance 320 may define the width of first region 318 around perimeter edge 316 of cover glass 310.

In some embodiments distance 320 may be in the range of 0.1 mm to 1.0 mm, including sub-ranges. In other words, distance 320 may be 0.1 mm, 0.2 mm, 0.3 mm, 0.4 mm, 0.5 mm, 0.6 mm, 0.7 mm, 0.8 mm, 0.9 mm, or 1.0 mm or within any range having any two of these values as endpoints. In some embodiments, distance 320 may be in the range of 0.2 mm to 1.0 mm. In some embodiments, distance 320 may be in the range of 0.2 mm to 0.5 mm.

In some embodiments, distance 320 may be the same along the entire perimeter of cover glass 310. In some embodiments, distance 320 may be varied along the perimeter of cover glass 310. For example, distance 320 may be larger around the corners of cover glass 310 than along the sides of cover glass 310. This may result in a coating layer having an edge located further away from perimeter edges of cover glass 310 around the corners of cover glass 310 than the perimeter edges of cover glass 310 along the sides of cover glass 310. Such a coating layer may be desirable because, in general, when an electronic device is damaged (e.g., from a large impact, for example, a user dropping the device), a cover glass tends to fail (crack or completely fracture) round the corners of the cover glass. Thus, a coating layer that is spaced further away from the corners of a cover glass may be beneficial for minimizing detrimental effects resulting from edge-to-edge coating of such a coating layer while allowing the largest possible area on the cover glass to be coated with the coating layer.

Patterning device 350 may also pattern sacrificial material 352 over a portion of base plate 340 during patterning of sacrificial material 352. In some embodiments, sacrificial material 352 may be directly patterned on first region 318 of cover glass 310 and a portion of base plate 340 around perimeter edge 316 of cover glass 310 while cover glass 310 is disposed on base plate 340. In such embodiments, sacrificial material 352 may serve to releasably fix cover glass 310 to base plate 340. In some embodiments, sacrificial material 352 may be cured to increase the strength of the releasable bond between sacrificial material 352 and base plate 340.

Figure 4:
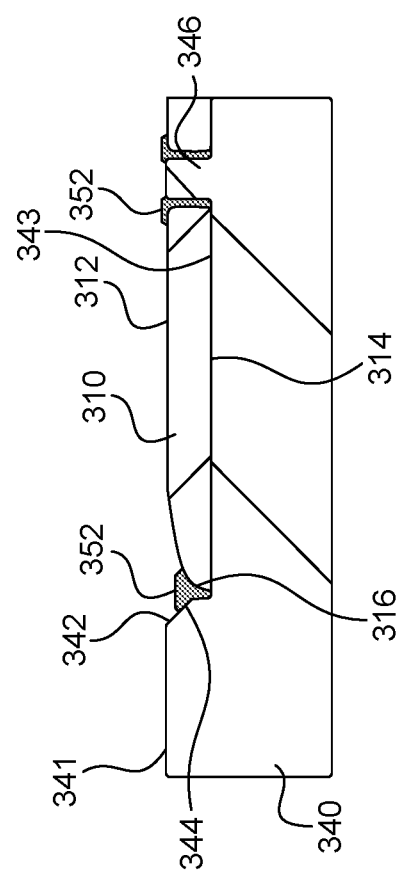
FIG. 4 shows a cross-section of a portion of FIG. 3 along the line 4-4'.

In some embodiments, sacrificial material 352 may be patterned over a portion of a top surface 341 of base plate 340. In some embodiments, for example as shown in FIGS. 3 and 4, sacrificial material 352 may be patterned over perimeter wall 344 of cavity 342 on base plate 340. In some embodiments, sacrificial material 352 may be disposed between perimeter edge 316 of cover glass 310 and perimeter wall 344 of cavity 342 (i.e., sacrificial material 352 may fill spaces between perimeter edge 316 and perimeter wall 344).

Figure 8B:
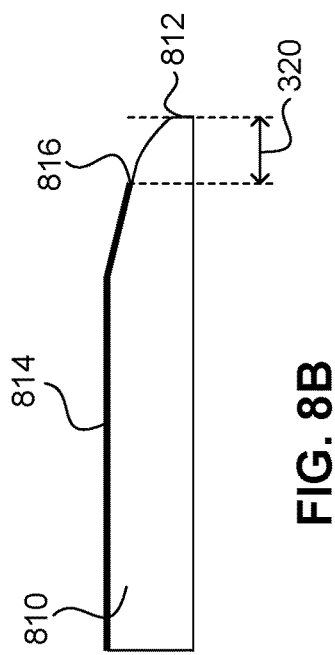
FIGS. 8A-8C illustrate cover glass edges according to various embodiments.
Figure 8A:
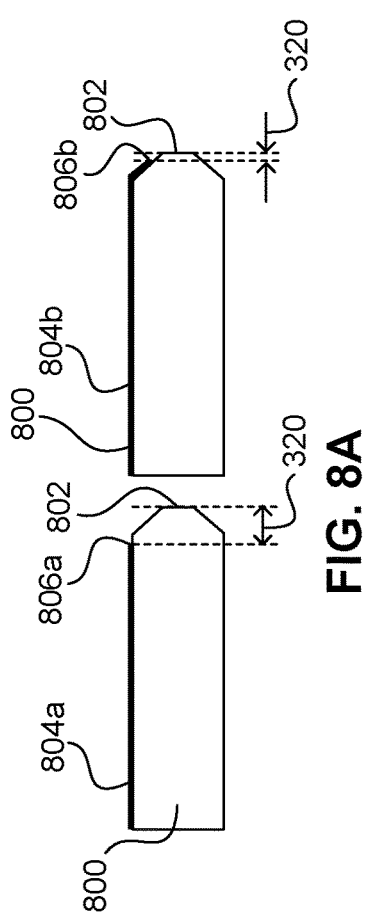
Figure 8C:
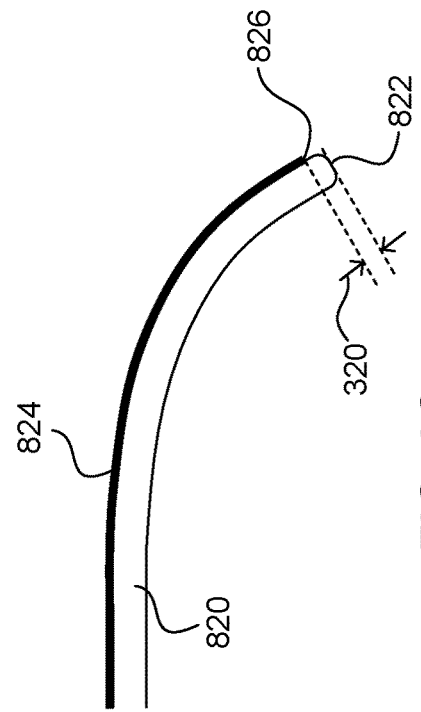

Direct patterning of sacrificial material 352 leaves a second region 322 on top surface 312 of cover glass 310 devoid of sacrificial material 352. Second region 322 corresponds to the region on top surface 312 onto which a non-edge-to-edge coating layer will be deposited. Second region 322 includes an interior edge 324 disposed at distance 320 from perimeter edge 316 of cover glass 310. In other words, distance 320 is the distance between perimeter edge 316 of cover glass and interior edge 324 of second region 322. In some embodiments, distance 320 may be the horizontal distance measured from perimeter edge 316 to a line intersecting interior edge 324 and extending parallel to perimeter edge 316. FIGS. 8A-8C show various exemplary distance 320 measurements for various first regions on various cover glasses.

In some embodiments, patterning device 350 may directly pattern sacrificial material 352 over one or more third regions 330 on top surface 312 of cover glass 310. Third regions 330 may be located around aperture(s) 326 that define openings through cover glass 310 (e.g., apertures for speaker holes or cameras). Third regions 330 may extend from an edge 328 of an aperture 326 to a distance 332 from edge 328. In other words, distance 332 may define the width of a third region 330 around an edge 328 of an aperture 326. In some embodiments, distance 332 may be the same as or similar to distance 320. Patterning sacrificial material 352 over third region(s) 330 protects third region(s) 330 from coating of a coating layer in the same fashion that patterning sacrificial material 352 over first region 318 protects first region 318 from coating.

In some embodiments, base plate 340 may include one or more protrusions 346 corresponding to the location(s) of aperture(s) 326 in cover glass 310. In such embodiments, protrusions 346 may be disposed within apertures 326 during direct patterning of sacrificial material 352 (see e.g., FIG. 4). In some embodiments, sacrificial material 352 may be patterned on at least a portion of protrusions 346 while cover glass 310 is disposed on base plate 340 in the same fashion that sacrificial material 352 may be patterned over a portion of top surface 341 and/or perimeter wall 344 when sacrificial material 352 is patterned over first region 318. Protrusions 346 may have an exterior shape that corresponds to the shape of an aperture 326 in cover glass 310. In other words, protrusions 346 may have an exterior shape that corresponds to the shape of an edge 328 of an aperture 326.

Figure 5B:
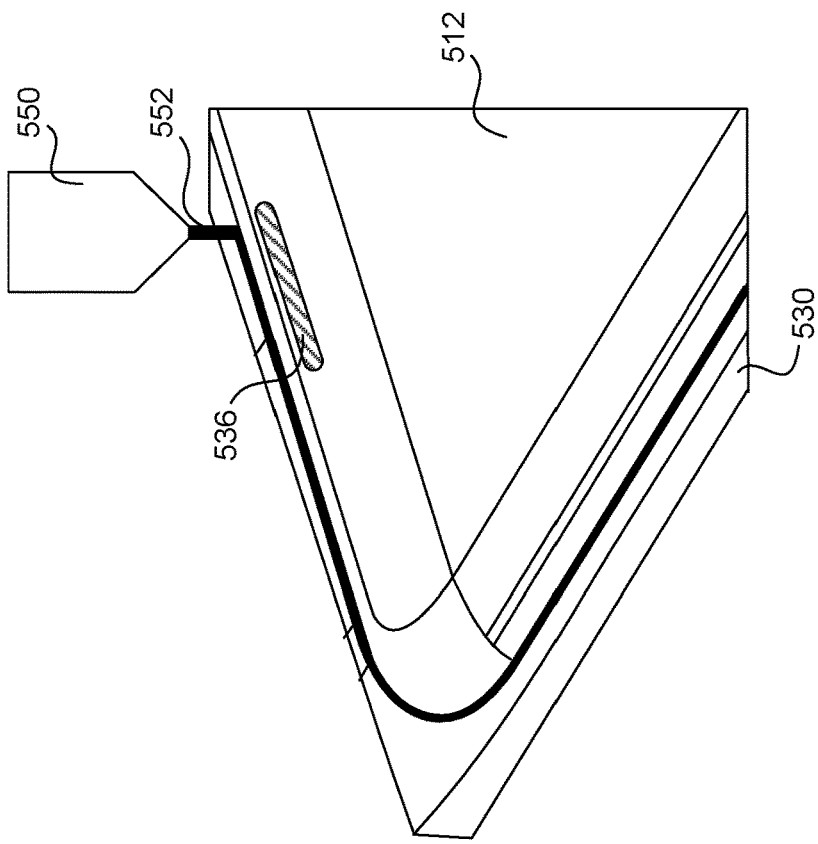
FIG. 5B illustrates an assembled view of a cover glass and a base plate according to some embodiments.
Figure 5A:
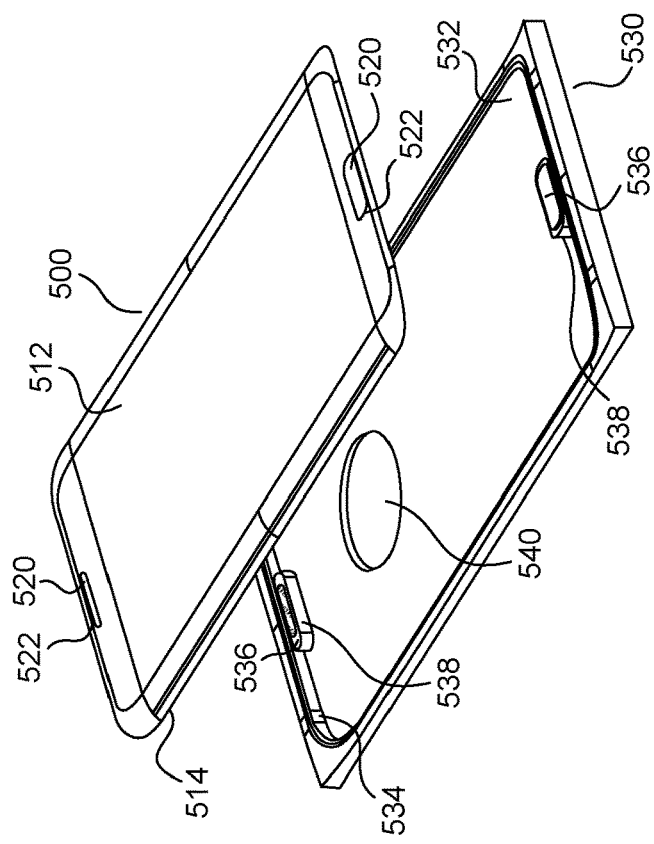
FIG. 5A illustrates an exploded view of a cover glass and a base plate according to some embodiments.

FIGS. 5A and 5B show an exemplary base plate 530 and cover glass 500 according to some embodiments. Base plate 530 may include a cavity 532 configured (sized and shaped) to receive all or a portion of cover glass 500. Cavity 532 may be defined by a perimeter wall 534 having a shape and size corresponding to the size and shape of a perimeter edge 514 of cover glass 500. In some embodiments, base plate 530 may include an opening 540 communicating with cavity 532. Opening 540 may allow for application of an external pushing force (e.g., by a robot or a human finger) to detach cover glass 500 from base plate 530.

In some embodiments, base plate 530 may include one or more protrusions 536 extending into cavity 532. Protrusions 536 have a least a portion configured to fit within apertures 520 formed in cover glass 500. Protrusions 536 may include protrusions walls 538 having a shape that corresponds to the shape of an edge 522 of an aperture 520 formed in cover glass 500. Protrusions 536 may serve to support cover glass 500, hold cover glass 500 in position on base plate 530, and/or provide a surface for patterning of sacrificial material adjacent to apertures 520 in cover glass 500.

As shown in FIG. 5B, after disposing cover glass 500 on base plate 530, a sacrificial material 552 may be patterned on a top surface 512 of cover glass 500 along the edges (i.e., perimeter edge 514 and aperture edges 522) of cover glass 500 by a patterning device 550. The patterning of sacrificial material 552 may be the same as or similar to the patterning of sacrificial material 352 discussed herein.

Figure 6:
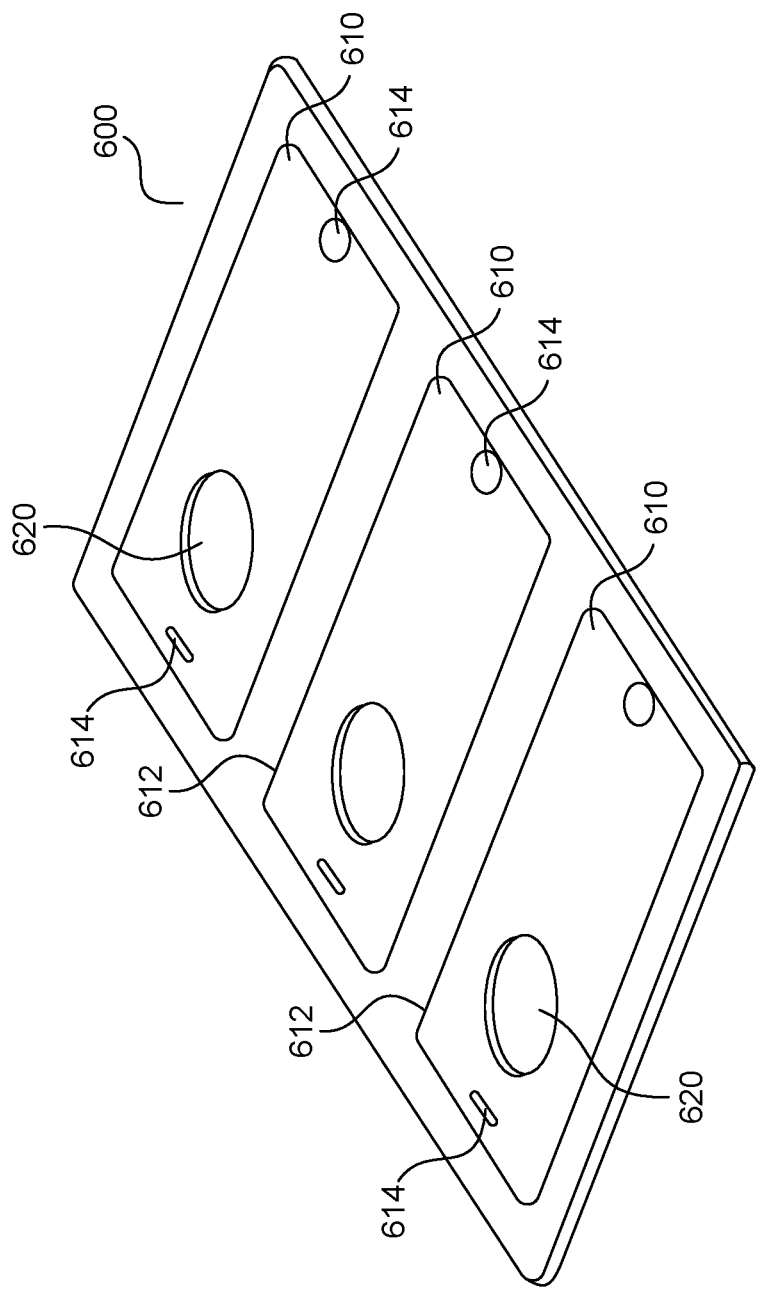
FIG. 6 illustrates a base plate according to some embodiments.

FIG. 6 shows a base plate 600 for supporting a plurality of cover glasses during deposition of a sacrificial material and/or coating layer. Base plate 600 may include a plurality of cavities 610 configured to receive all or a portion of a cover glass. Cavities 610 may include perimeter walls 612, and base plate 600 may include protrusions 614 extending into cavities, each sized and shaped for a particular type of cover glass (e.g., a cover glass designed for a particular electronic device). Base plate 600 may also include openings 620, communicating with cavities 610, to allow application of an external pushing force to detach cover glasses from base plate 600 after patterning of a sacrificial layer and/or deposition of a coating layer.

In some embodiments, cavities 610 may be the same as or similar to cavities 342 and 532 discussed herein. For example, cavities 610 may be defined by a perimeter wall having a shape and size corresponding to the size and shape of a perimeter edge of cover glass (e.g., perimeter edge 514 of cover glass 500). In some embodiments, each cavities 610 on base plate 600 may be the same (i.e., configured to hold the same type of cover glass). In some embodiments, different cavities 610 on base plate 600 may be different (e.g., configured to hold different types of cover glass).

Figure 7:
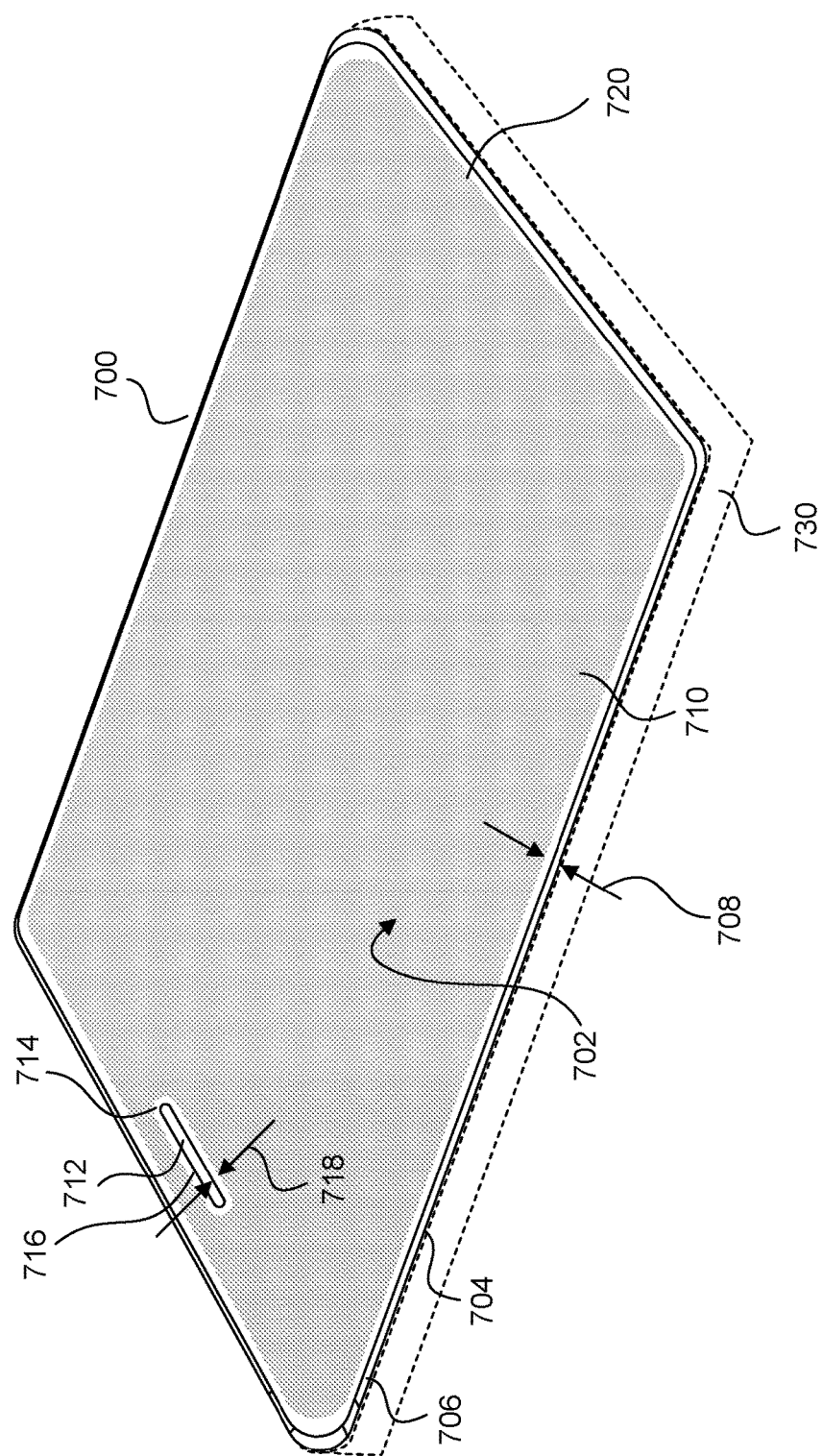
FIG. 7 illustrates a cover glass and an article according to some embodiments.

FIG. 7 shows a cover glass 700 coated with a coating layer 720 according to some embodiments. Cover glass 700 may be made using a coating process as discussed herein. Cover glass 700 may be a 2D, 2.5D, or 3D cover glass. As shown in FIG. 7, cover glass 700 includes a top surface 702 and a perimeter edge 704. Top surface 702 of cover glass 700 includes a first region 706 devoid of a coating layer 720 and a second region 710 that is coated with coating layer 720. First region 706 includes at least a portion of perimeter edge 704 and a region extending from perimeter edge 704 to a distance 708 from perimeter edge 704 on top surface 702. In some embodiments, first region 706 may include the entire perimeter edge 704 of cover glass 700 and a region extending from perimeter edge 704 to a distance 708 from perimeter edge 704 on top surface 702. In other words, first region 706 may be an area in the shape of a peripheral border on top surface 702 of cover glass 700.

Distance 708 may define the width of first region 706 around perimeter edge 704 of cover glass 700. In some embodiments distance 708 may be in the range of 0.1 mm to 1.0 mm, including sub-ranges. In other words, distance 708 may be 0.1 mm, 0.2 mm, 0.3 mm, 0.4 mm, 0.5 mm, 0.6 mm, 0.7 mm, 0.8 mm, 0.9 mm, or 1.0 mm or within any range having any two of these values as endpoints. In some embodiments, distance 708 may be in the range of 0.2 mm to 1.0 mm. In some embodiments, distance 708 may be in the range of 0.2 mm to 0.5 mm.

In some embodiments, cover glass 700 may include one or more apertures 712 defining opening(s) in cover glass 700. Aperture(s) 712 may include aperture edge(s) 716. In some embodiments, cover glass 700 may include third region(s) 714 located at and around edge(s) 716 of aperture(s) 712. Third regions 714 may be devoid of a coating layer and may extend from an edge 716 of an aperture 712 to a distance 718 from edge 716. In other words, distance 718 may define the width of a third region 714 around an aperture edge 716. In some embodiments, distance 718 may be the same as or similar to distance 708.

Cover glass 700 may be included on an article 730 (shown in broken lines in

FIG. 7 for illustration purposes) to protect portions of article 730, for example the display components of article 730. Article 730 may be, but is not limited to, a mobile phone, a tablet computer device, and a wearable device (e.g., a watch).

FIGS. 8A-8C show various cover glass edge shapes that may be coated using a coating process discussed herein. As used herein, "2D cover glass" includes a cover glass having a perimeter edge with a chamfered shape on the front and/or back surfaces of cover glass adjacent to the perimeter edge. The chamfered shape on the front and/or back surfaces may be formed, for example, by a finishing method including mechanical grinding. A 2D cover glass may have a chamfered shape on the front and back surfaces of the cover glass that is the same or different. As used herein, "2.5D cover glass" means a cover glass having a perimeter edge with a curved surface on its front side. The curved surface may be formed by, for example, a mechanical polishing method. The curved surface on the front side of a 2.5D cover glass is smoother to the touch than 2D cover glass. As used herein, "3D cover glass" means a cover glass having a bent perimeter edge to form a non-planar shape. Bent perimeter edge may be formed by, for example, thermal forming and/or cold-forming. A 3D cover glass has a curved bottom surface and a curved top surface adjacent to the perimeter edge of the cover glass.

FIG. 8A shows a perimeter edge 802 of a 2D cover glass 800 according to some embodiments. For example, perimeter edge 802 of a 2D cover glass may be finished by a mechanical grinding method to create a chamfered shape on the front and back surfaces of cover glass adjacent to perimeter edge 802. In some embodiments, the chamfered shape on the front and back surfaces of cover glass 800 may be the same. As shown in FIG. 8A, cover glass 800 may be coated with a coating layer 804a/b, but perimeter edge 802 and a region adjacent to perimeter edge 802 of cover glass 800 is devoid of coating layer 804a/b (e.g., in a first region of cover glass 800 over a distance 320). Coating layers 804a/b may include coating edges 806a/b formed at about a 90 degree angle (e.g., 85 degrees to 95 degrees) relative to a surface adjacent to perimeter edge 802 on cover glass 800. Coating layer edges 806a/b formed at right angles may help prevent the formation of a moire pattern at edge 806a/b of coating layer 804a/b.

As illustrated in FIG. 8A, the distance 320 from perimeter edge 802 to coating layer edge 806a/b (i.e., the width of a first region on cover glass 800) may be varied. This distance may be varied by adjusting the patterning of a sacrificial material on cover glass 800. For example, coating edge 806a may be located on a flat top surface of cover glass 800 adjacent to perimeter edge 802 as shown on the left side of FIG. 8A. As another example, coating edge 806b may be located on a chamfered surface adjacent to perimeter edge 802 as shown on the right side of FIG. 8A.

FIG. 8B shows a 2.5D cover glass 810 according to some embodiments. 2.5D cover glass 810 may include a perimeter edge 812 that is finished with a mechanical polishing method to form a curved surface on its front side. As such, 2.5D cover glass 810 may have a perimeter edge 812 having a flat bottom surface and a curved top surface adjacent to perimeter edge 812. Cover glass 810 may be coated with a coating layer 814, but perimeter edge 812 and a region adjacent to perimeter edge 812 of cover glass 810 is devoid of coating layer 814 (e.g., in a first region of cover glass 810 over a distance 320). Coating layer 814 may include a coating edge 816 formed at about a 90 degree angle (e.g., 85 degrees to 95 degrees) relative to a surface adjacent to perimeter edge 812 on cover glass 810. In some embodiments, as shown for example in FIG. 8B, coating edge 816 may be located on the curved top surface of cover glass 810 adjacent to perimeter edge 812.

FIG. 8C shows a 3D cover glass 820 according to some embodiments. 3D cover glass 820 may be formed under high temperature to bend an outer peripheral portion including its perimeter edge 822. As such, 3D cover glass 820 may have a curved bottom surface and a curved top surface adjacent to perimeter edge 822. Similar to cover glasses 800 and 810, cover glass 820 may be coated with a coating layer 824, but perimeter edge 822 and a region adjacent to perimeter edge 822 of cover glass 820 is devoid of coating layer 824 (e.g., in a first region of cover glass 820 over a distance 320). Coating layer 824 may include a coating edge 826 formed at about a 90 degree angle (e.g., 85 degrees to 95 degrees) relative to a curved surface adjacent to perimeter edge 822 on cover glass 820.

FIG. 9 shows a mechanical assembly 900 for fixing and masking a cover glass during a coating deposition process to form a non-edge-to-edge coating on a cover glass. Mechanical assembly 900 includes a cover glass 910 fixed and masked by a mechanical mask 920. Mechanical mask 920 physically contacts a top surface of cover glass 910 to fix and mask a perimeter edge of cover glass 910. During deposition of a coating layer 930, mechanical mask 920 may disrupt the path 940 of coating particles being deposited at and near the edge 932 of coating layer 930. This disruption may result in the formation of a non-uniform coating thickness and a moire pattern at and near edge 932 of coating layer 930.

Figure 10:
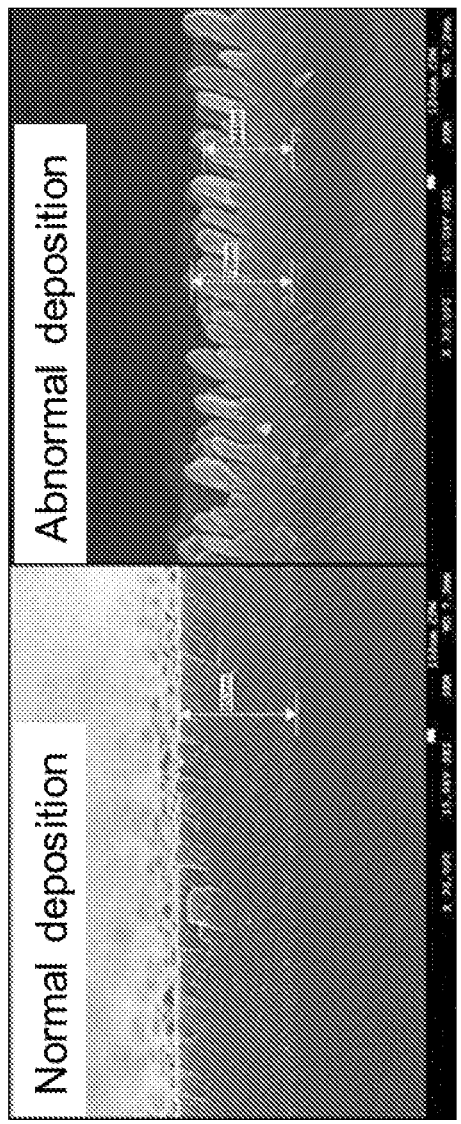
FIG. 10 shows a comparison of normal deposition and abnormal deposition of a coating layer on cover glass.

Mechanical mask 920 may be machined with high machine tolerances to avoid damaging cover glass 910 during use, which can be expensive. Further, due to limitations in machining tolerances, there may be a micro scale gap between mechanical mask 920 and cover glass 910 that may allow coating layer 930 to leak between mask 920 and cover glass 910. A gap as small as tenths of a micron may cause abnormal deposition of a coating layer 930 at and/or near edge 932 of coating layer 932. Abnormal deposition can cause visual defects at and/or near edge 932 of coating layer 930. Nonetheless, mechanical mask 920 may be useful in certain situations. FIG. 10 shows a comparison between a coating layer edge deposited normally and a coating layer edge deposited abnormally due to leakage between a mask and a top surface of a cover glass. The direct patterning processes discussed herein avoid these limitations and problems associated with mechanical assembly 900.

Figure 11:
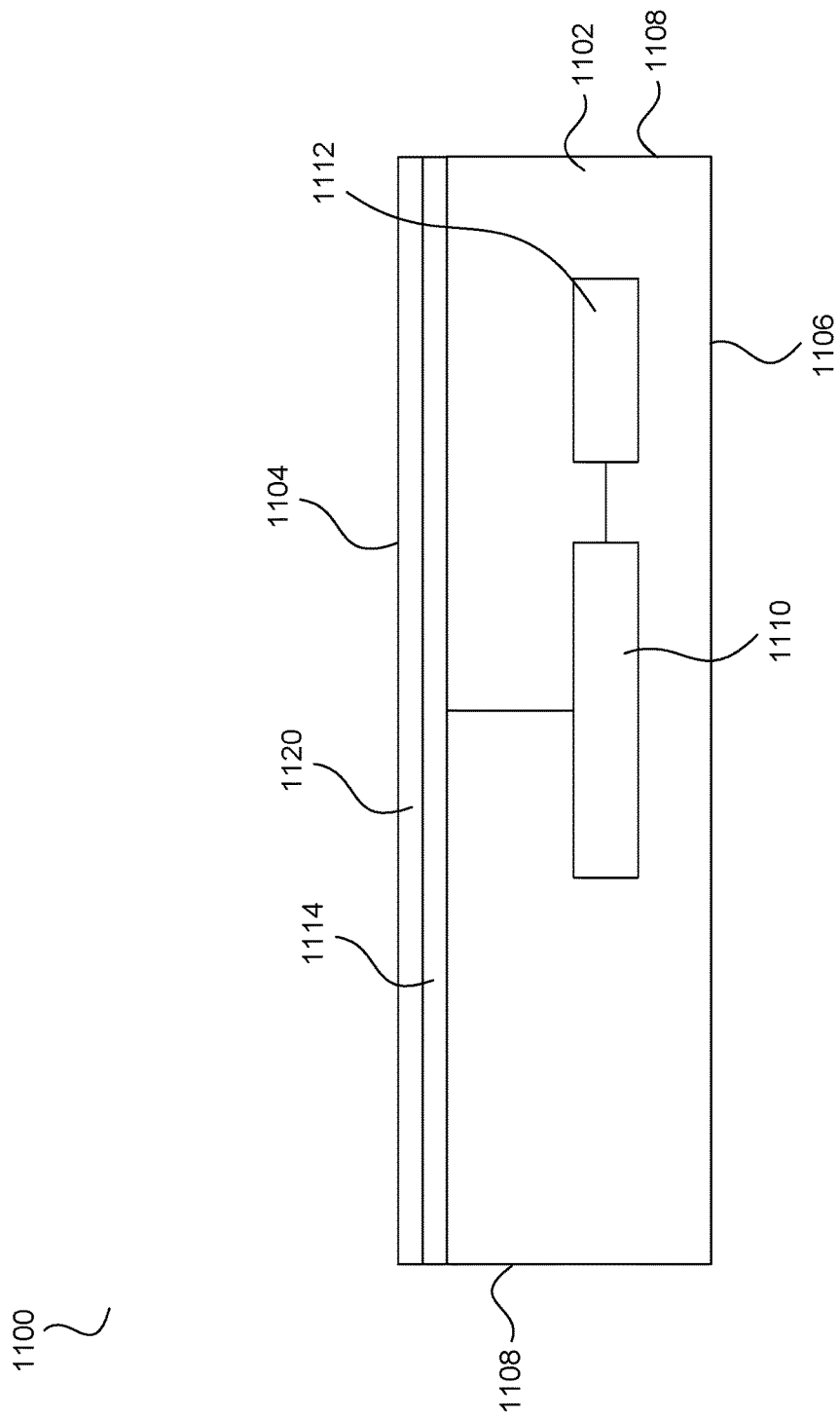
FIG. 11 illustrates a consumer product according to some embodiments.

FIG. 11 shows a consumer electronic product 1100 according to some embodiments. Consumer electronic product 1100 may include a housing 1102 having a front (user-facing) surface 1104, a back surface 1106, and side surfaces 1108. Electrical components may be provided at least partially within housing 1102. The electrical components may include, among others, a controller 1110, a memory 1112, and display components, including a display 1114. In some embodiments, display 1114 may be provided at or adjacent to front surface 1104 of housing 1102.

As shown for example in FIG. 11, consumer electronic device 1100 may include a cover glass 1120. Cover glass 1120 may serve to protect display 1114 and other components of electronic device 1100 (e.g., controller 1110 and memory 1112) from damage. In some embodiments, cover glass 1120 may be disposed over display 1114. Cover glass 1120 may be made using a coating process as discussed herein and may be the same as or similar to cover glasses discussed herein (e.g., cover glass 700). Cover glass 1120 may be a 2D, 2.5D, or 3D cover glass. In some embodiments, cover glass 1120 may define front surface 1104 of housing 1102. In some embodiments, cover glass 1120 may define front surface 1104 of housing 1102 and all or a portion of side surfaces 1108 of housing 1102. In some embodiments, consumer electronic device 1110 may include a cover glass defining all or a portion of back surface 1106 of housing 1102.

While various embodiments have been described in the context of coating a cover glass, other glass-based articles (including glass ceramic articles), for example but not limited to, architectural glass windows, automotive glass windows, camera lenses, and glass ceramics for consumer appliances, may be coated and processed in the same manner as discussed herein.

While various embodiments have been described herein, they have been presented by way of example only, and not limitation. It should be apparent that adaptations and modifications are intended to be within the meaning and range of equivalents of the disclosed embodiments, based on the teaching and guidance presented herein. It therefore will be apparent to one skilled in the art that various changes in form and detail can be made to the embodiments disclosed herein without departing from the spirit and scope of the present disclosure. The elements of the embodiments presented herein are not necessarily mutually exclusive, but may be interchanged to meet various situations as would be appreciated by one of skill in the art.

Embodiments of the present disclosure are described in detail herein with reference to embodiments thereof as illustrated in the accompanying drawings, in which like reference numerals are used to indicate identical or functionally similar elements. References to "one embodiment," "an embodiment," "some embodiments," "in certain embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "or," as used herein, is inclusive; more specifically, the phrase "A or B" means "A, B, or both A and B." Exclusive "or" is designated herein by terms such as "either A or B" and "one of A or B," for example. The indefinite articles "a" and "an" and the definite article "the" to describe an element or component means that one or at least one of these elements or components is present, unless otherwise stated in specific instances.

Where a range of numerical values is recited herein, comprising upper and lower values, unless otherwise stated in specific circumstances, the range is intended to include the endpoints thereof, and all integers and fractions within the range. It is not intended that the scope of the claims be limited to the specific values recited when defining a range. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about."

Directional terms as used herein—for example up, down, right, left, front, back, top, bottom—are made only with reference to the figures as drawn and are not intended to imply absolute orientation.

As used herein the term "glass" is meant to include any material made at least partially of glass, including glass and glass-ceramics. "Glass-ceramics" include materials produced through controlled crystallization of glass. In embodiments, glass-ceramics have about 30% to about 90% crystallinity. Non-limiting examples of glass ceramic systems that may be used include $Li_2O \times Al_2O_3 \times nSiO_2$ (i.e. LAS system), $MgO \times Al_2O_3 \times nSiO_2$ (i.e. MAS system), and $ZnO \times Al_2O_3 \times nSiO_2$ (i.e. ZAS system).

The present embodiment(s) have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

What is claimed is:

1. A method of coating a glass-based article, the method comprising:
   direct patterning a sacrificial material over a first region on a top surface of the glass-based article but not a second region on the top surface of the glass-based article, the first region comprising at least a portion of a perimeter edge of the glass-based article;
   depositing a coating layer over the glass-based article; and
   removing the sacrificial material such that the coating layer is disposed on the second region on the top surface of the glass-based article and not the first region.

2. The method of claim 1, further comprising curing the sacrificial material after direct patterning of the sacrificial material and before depositing a coating layer.

3. The method of claim 2, wherein the thickness of the sacrificial material after curing is greater than or equal to 10 microns.

4. The method of claim 1, wherein the first region comprises the entire perimeter edge of the glass-based article.

5. The method of claim 1, wherein the first region extends from the perimeter edge of the glass-based article to a distance in the range of 0.1 mm to 1.0 mm from the perimeter edge.

6. The method of claim 1, wherein direct patterning of the sacrificial material comprises a process selected from the group consisting of: screen printing, inkjet printing, and dispensing.

7. The method of claim 1, further comprising disposing the glass-based article on a base plate comprising a cavity configured to hold the glass-based article before direct patterning of the sacrificial material.

8. The method of claim 7, wherein the cavity comprises a perimeter wall with a shape that corresponds to the shape of the perimeter edge of the glass-based article.

9. The method of claim 7, wherein the sacrificial material is directly patterned on the first region of the glass-based article and a portion of the base plate around the perimeter edge of the glass-based article while the glass-based article is disposed on the base plate.

10. The method of claim 9, further comprising curing the sacrificial material after directing patterning of the sacrificial material, wherein the sacrificial material releasably fixes the glass-based article to the base plate when the sacrificial material is cured.

11. The method of claim 7, wherein the glass-based article is removed from the base plate after the coating layer is deposited over the glass-based article.

12. The method of claim 11, wherein the sacrificial material is removed after the glass-based article is removed from the base plate.

13. The method of claim 1, wherein the coating layer comprises a scratch resistant coating layer.

14. The method of claim 1, wherein the sacrificial material is directly patterned as a liquid comprising a viscosity of greater than or equal to 200 centipoise (cps).

15. The method of claim 1, wherein the sacrificial material is selected from the group consisting of: a photoresist and a polyamide.

16. The method of claim 1, wherein the glass-based article comprises an aperture defining an opening through the glass-based article and wherein direct patterning of the sacrificial material further comprises direct patterning sacrificial material in a third region on the top surface of the glass-based article around a perimeter edge of the aperture.

17. The method of claim 16, further comprising disposing the glass-based article on a base plate comprising a cavity configured to hold the glass-based article before direct patterning of the sacrificial material,
   wherein the base plate comprises a protrusion extending into the cavity with an exterior shape corresponding to the shape of the aperture on the glass-based article, and
   wherein the sacrificial material is directly patterned on the third region of the glass article and at least a portion of the protrusion while the glass-based article is disposed on the base plate.

18. The method of claim 1, wherein the sacrificial material is removed by etching.

19. The method of claim 1, wherein the direct patterning is different from a photolithography method, wherein the direct patterning does not require exposure and development steps to form a pattern.

20. The method of claim 1, wherein the glass-based article is a cover glass of a consumer electronics product.

* * * * *

UNITED STATES PATENT AND TRADEMARK OFFICE
CERTIFICATE OF CORRECTION

| | |
|---|---|
| PATENT NO. | : 11,370,698 B2 |
| APPLICATION NO. | : 16/347120 |
| DATED | : June 28, 2022 |
| INVENTOR(S) | : Jae-chang Lee |

It is certified that error appears in the above-identified patent and that said Letters Patent is hereby corrected as shown below:

On the Title Page

On the page 2, in Column 2, under "Other Publications", Line 1, delete "Photresist" and insert -- Photoresist --.

In the Specification

In Column 1, Line 13 (Approx.), delete "0146586" and insert -- 0146586, --.

Signed and Sealed this
Eighth Day of August, 2023

Katherine Kelly Vidal
*Director of the United States Patent and Trademark Office*